(12) United States Patent
Motokawa et al.

(10) Patent No.: US 11,967,690 B2
(45) Date of Patent: Apr. 23, 2024

(54) BATTERY PACK

(71) Applicant: Panasonic Intellectual Property Management Co., Ltd., Osaka (JP)

(72) Inventors: Shinya Motokawa, Hyogo (JP); Keisuke Shimizu, Osaka (JP); Chifumi Murayama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 456 days.

(21) Appl. No.: 16/638,953

(22) PCT Filed: Dec. 19, 2018

(86) PCT No.: PCT/JP2018/046680
§ 371 (c)(1),
(2) Date: Feb. 13, 2020

(87) PCT Pub. No.: WO2019/131358
PCT Pub. Date: Jul. 4, 2019

(65) Prior Publication Data
US 2020/0227714 A1 Jul. 16, 2020

(30) Foreign Application Priority Data

Dec. 27, 2017 (JP) .................... 2017-250492

(51) Int. Cl.
*H01M 50/507* (2021.01)
*H01M 10/647* (2014.01)
(Continued)

(52) U.S. Cl.
CPC ....... *H01M 10/647* (2015.04); *H01M 50/209* (2021.01); *H01M 50/262* (2021.01);
(Continued)

(58) Field of Classification Search
CPC ............ H01M 50/531; H01M 10/647; H01M 50/209; H01M 50/289; H01M 50/502;
(Continued)

(56) References Cited

U.S. PATENT DOCUMENTS

| 11,011,783 | B2 * | 5/2021 | Hermann | ............ H01M 50/543 |
| 2010/0266887 | A1 * | 10/2010 | Sekino | ................ H01M 50/209 |
| | | | | 429/123 |

(Continued)

FOREIGN PATENT DOCUMENTS

| JP | 2011-076936 | 4/2011 |
| JP | 2013-114951 | 6/2013 |

(Continued)

OTHER PUBLICATIONS

International Search Report of PCT application No. PCT/JP2018/046680 dated Mar. 26, 2019.

(Continued)

*Primary Examiner* — Matthew T Martin
*Assistant Examiner* — Jessie Walls-Murray
(74) *Attorney, Agent, or Firm* — Rimon P.C.

(57) ABSTRACT

A battery pack includes a plurality of bus bars serving to form a plurality of parallel battery structures that each have parallel connection of two or more of a plurality of prismatic batteries. The plurality of bus bars electrically connect the plurality of prismatic batteries to connect the plurality of parallel battery structures in series. The plurality of parallel battery structures connected in series form a battery connection structure that includes a turn causing a reversal of direction of series connection of the plurality of parallel battery structures.

8 Claims, 4 Drawing Sheets

(51) Int. Cl.
*H01M 50/209* (2021.01)
*H01M 50/262* (2021.01)
*H01M 50/271* (2021.01)
*H01M 50/289* (2021.01)
*H01M 50/503* (2021.01)
*H01M 50/509* (2021.01)
*H01M 50/51* (2021.01)
*H01M 50/55* (2021.01)
*H01M 50/553* (2021.01)
*H01M 50/242* (2021.01)

(52) U.S. Cl.
CPC ....... *H01M 50/271* (2021.01); *H01M 50/289* (2021.01); *H01M 50/503* (2021.01); *H01M 50/507* (2021.01); *H01M 50/509* (2021.01); *H01M 50/51* (2021.01); *H01M 50/55* (2021.01); *H01M 50/553* (2021.01); *H01M 50/242* (2021.01)

(58) Field of Classification Search
CPC .. H01M 50/507; H01M 50/51; H01M 50/543; H01M 50/553; H01M 50/262; H01M 50/271; H01M 50/503; H01M 50/509; H01M 50/55; Y02E 60/10
See application file for complete search history.

(56) References Cited

U.S. PATENT DOCUMENTS

| | | |
|---|---|---|
| 2011/0076521 A1 | 3/2011 | Shimizu et al. |
| 2014/0014418 A1* | 1/2014 | Komaki ............ H01M 50/209 429/143 |
| 2014/0045024 A1* | 2/2014 | Waters ............. H01M 50/242 429/99 |
| 2015/0037633 A1 | 2/2015 | Akiyama et al. |
| 2015/0255774 A1* | 9/2015 | Menzies ........... H01M 50/543 429/158 |
| 2016/0336573 A1* | 11/2016 | Osanai ............. H01M 10/425 |
| 2017/0225558 A1* | 8/2017 | Newman ............ B60K 1/04 |
| 2018/0130991 A1* | 5/2018 | Kim ................ H01M 50/289 |

FOREIGN PATENT DOCUMENTS

| | | |
|---|---|---|
| JP | 2013-191305 | 9/2013 |
| JP | 2015-032391 A | 2/2015 |

OTHER PUBLICATIONS

English Translation of Chinese Office Action dated Mar. 21, 2022 for the related Chinese Patent Application No. 201880053643.9.

* cited by examiner

BATTERY PACK

CROSS-REFERENCE TO RELATED APPLICATIONS

This application is a U.S. national stage application of the PCT International Application No. PCT/JP2018/046680 filed on Dec. 19, 2018, which claims the benefit of foreign priority of Japanese patent application 2017-250492 filed on Dec. 27, 2017, the contents all of which are incorporated herein by reference.

TECHNICAL FIELD

The present disclosure relates to a battery pack.

BACKGROUND ART

A conventional battery pack is described in PTL 1. This battery pack includes a plurality of battery modules that are spaced in one direction. Each of the battery modules includes a plurality of prismatic batteries that are stacked in a direction running straight to both the one direction and a height of each of the prismatic batteries. Electrodes of the prismatic batteries are electrically connected via bus bars only within the battery module to which these prismatic batteries belong. The plurality of battery modules are connected in parallel or in series.

CITATION LIST

Patent Literature

PTL 1: Unexamined Japanese Patent Publication No. 2013-191305

SUMMARY OF THE INVENTION

As energy density of prismatic batteries increases with development, an amount of heat that the prismatic battery gives off when abnormally heated by an internal short circuit or the like also increases. Accordingly, increasing amounts of heat are conducted to other prismatic batteries from the abnormally heated prismatic battery. Therefore, those other prismatic batteries are easily caused by the heat conducted from the abnormally heated prismatic battery to experience temperature rises and thus are more likely to be abnormally heated up. Meanwhile, it is preferable if a high-output, compact battery pack is achieved.

An object of the present disclosure is to provide a battery pack that easily provides higher output, allows easy downsizing and can easily disperse heat of an abnormally heated prismatic battery over a wider area for suppression of heat damage to those prismatic batteries working normally.

To solve the above problems, a battery pack according to the present disclosure includes a housing, a plurality of prismatic batteries, and a plurality of bus bars. The housing internally defines a battery storage room. The plurality of prismatic batteries are disposed in rows in the battery storage room with each of the rows including two or more of the plurality of prismatic batteries, and the two or more of the plurality of prismatic batteries are disposed in substantially parallel relation with widthwise extending side faces of the two or more of the plurality of prismatic batteries being aligned in a direction along a depth of each of the two or more of the plurality of prismatic batteries. The plurality of bus bars serve to form a plurality of parallel battery structures that each have parallel connection of two or more of the plurality of prismatic batteries. The plurality of bus bars electrically connect the plurality of prismatic batteries to connect the plurality of parallel battery structures in series. The plurality of parallel battery structures connected in series form a battery connection structure that includes a turn causing a reversal of direction of series connection of the plurality of parallel battery structures.

The battery pack according to the present disclosure easily provides higher output, allows easy downsizing and can easily disperse heat of an abnormally heated prismatic battery over a wider area for suppression of heat damage to those prismatic batteries working normally.

DESCRIPTION OF EMBODIMENT

An exemplary embodiment of the present disclosure is hereinafter described in detail with reference to the accompanying drawings. If a plurality of exemplary embodiments or modifications are included below, their characteristics are considered from the first to form appropriate combinations in new exemplary embodiments. The drawings mentioned below are schematic and thus do not necessarily have the same dimension ratios. In the following description and the drawings, an X-direction indicates a depth of a prismatic battery, a Y-direction indicates a width of the prismatic battery, and a Z-direction indicates a height of the prismatic battery. The X-direction, the Y-direction, and the Z-direction are orthogonal to one another.

Figure 1:
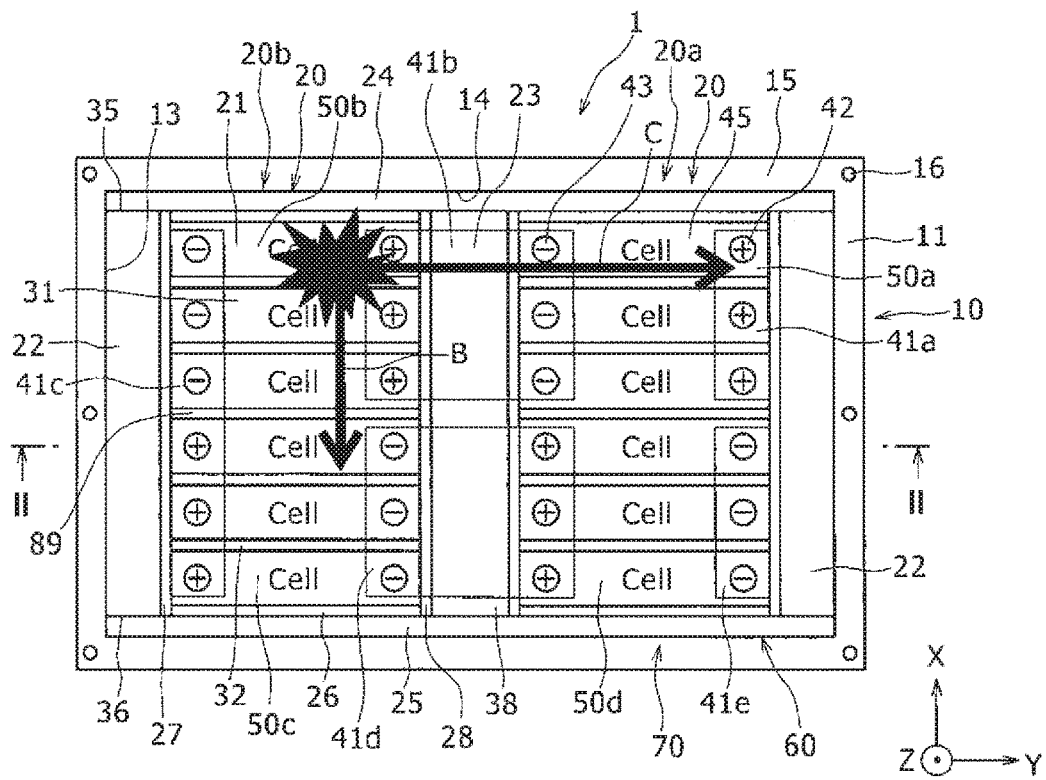
FIG. 1 is a schematic plan view illustrating, with a lid removed, a battery pack according to an exemplary embodiment of the present disclosure.
Figure 2:
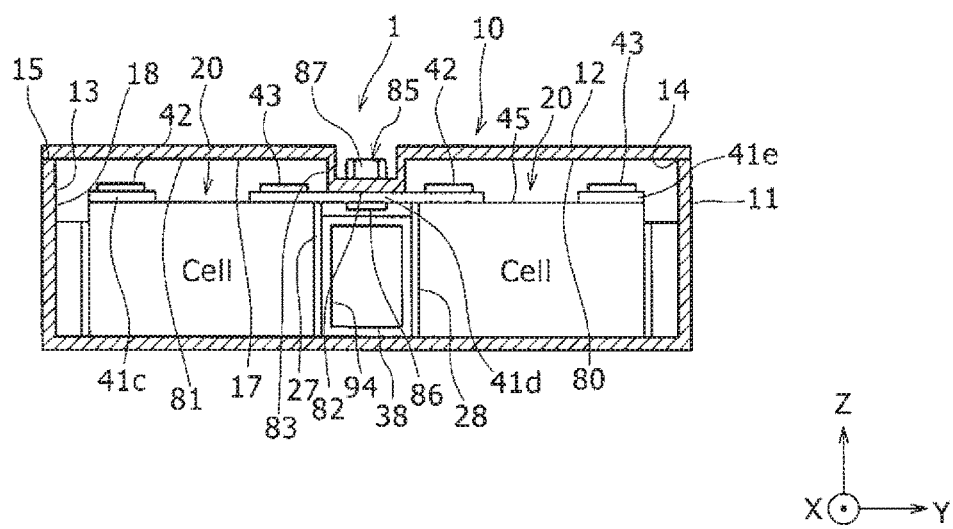
FIG. 2 is a schematic sectional view of the battery pack mounted with the lid, the section corresponding to a section along line II-II of FIG. 1.

FIG. 1 is a schematic plan view illustrating battery pack 1 with lid 12 removed. FIG. 2 is a schematic sectional view of battery pack 1 mounted with lid 12, the section corresponding to a section along line II-II of FIG. 1.

As illustrated in FIG. 1, battery pack 1 includes housing 10 and two battery modules 20. Housing 10 includes main body 11, lid 12 (refer to FIG. 2), and a plurality of screws (not illustrated). Main body 11 and lid 12 are each made of a metal such as aluminum or iron, or a resin. Main body 11 is a box-shaped member having recess 13 of substantially rectangular parallelepiped shape. Recess 13 includes only upper opening 14 of rectangular shape in the Z-direction. Main body 11 includes upper end face 15 of frame shape in the Z-direction. End face 15 includes tapped holes 16 that are provided substantially at equally spaced intervals along a periphery of end face 15.

Reference is made to FIG. 2. Lid 12 is a plate member that is rectangular in plan view. Lid 12 has substantially the same rectangular shape as main body 11 in top-down view looking along the Z-direction. After the plurality of battery modules 20 (described later in detail) and others are appropriately housed in recess 13, lid 12 is placed so as to overlie main body 11 when seen from above along the Z-direction, thus closing opening 14. Thereafter, each of the screws is driven from above lid 12 into a through hole (tapped hole) provided in lid 12 and tapped hole 16. In this way, lid 12 is mounted to main body 11. Consequently, battery pack 1 is formed. In battery pack 1 thus formed, an inner surface defining recess 13 and underside 17 of lid 12 define battery storage room 18. Battery storage room 18 includes a pair of sides extending in the X-direction, and a pair of sides extending in the Y-direction.

Reference is made again to FIG. 1. Disposed in battery storage room 18, two battery modules 20 adjoin in the Y-direction. In plan view, two battery modules 20 adjoining in the Y-direction have a slightly smaller area than recess 13. Therefore, in battery storage room 18, two battery modules 20 are substantially immovable in the X- and Y-directions relative to battery storage room 18.

Each of battery modules 20 includes battery stack 21, one-side bind bar 22, opposite-side bind bar 23, one-end plate 24, and opposite-end plate 25. Battery stack 21 includes a plurality of prismatic (=rectangular) batteries (cells) 31 each having substantially the shape of a rectangular parallelepiped, and a plurality of inter-battery separators 32. The plurality of prismatic batteries 31 are stacked in one row in the X-direction. Each of prismatic batteries 31 is, for example, a secondary battery that is rechargeable, such as a lithium-ion battery, a nickel metal hydride battery, or a nickel-cadmium battery. Each prismatic battery 31 has its principal surface covered with an insulating sheet such as a shrink tube. Each of inter-battery separators 32 is disposed between two prismatic batteries 31 adjoining in the X-direction. Each inter-battery separator 32 is a sheet member that is made of an insulating material such as a resin. Each inter-battery separator 32 is provided for ensuring insulation between two prismatic batteries 31 adjoining in the X-direction.

Each of one-side and opposite-side bind bars 22, 23 is a plate member or a tube member of prismatic shape, is made of a metal such as aluminum or iron, and extends in the X-direction. Each of one-side and opposite-side bind bars 22, 23 has a slightly greater X-direction dimension than battery stack 21. One-side bind bar 22 binds battery stack 21 at one Y-direction side of battery stack 21, while opposite-side bind bar 23 binds battery stack 21 at an opposite Y-direction side of battery stack 21. Each of one-end and opposite-end plates 24, 25 is a plate member that is made of a metal such as aluminum or iron and extends in the Y-direction. Each of one-end and opposite-end plates 24, 25 has a greater Y-direction dimension than battery stack 21. One-end plate 24 binds battery stack 21 at one X-direction side of battery stack 21, while opposite-end plate 25 binds battery stack 21 at an opposite X-direction side of battery stack 21. It is to be noted that each of one-side and opposite-side bind bars 22, 23 is not limited to the metal member and may be a plastic member using, for example, carbon fiber reinforced plastic (CFRP) if weight reduction takes priority over heat dissipation.

To be more specific, each of one-side and opposite-side bind bars 22, 23 is provided with, in each of its X-direction end faces 35, 36, a tapped hole (not illustrated) that extends in the X-direction for end plate fixation, and each of one-end and opposite-end plates 24, 25 is provided with through holes (tapped holes). Each battery module 20 also includes end separators 26, one-side separator 27, and opposite-side separator 28. End separators 26, one-side separator 27, and opposite-side separator 28 are each a sheet member that is made of an insulating material such as a resin. End separator 26 is disposed between one X-direction end of battery stack 21 and one-end plate 24 as well as between an opposite X-direction end of battery stack 21 and opposite-end plate 25. On the other hand, one-side and opposite-side separators 27, 28 each extend in the X-direction. An X-direction length of each of one-side and opposite-side separators 27, 28 is substantially equal to a sum of an X-direction length of battery stack 21 and a length that is twice an X-direction length (thickness) of end separator 26. One-side separator 27 is disposed between one Y-direction end of battery stack 21 and one-side bind bar 22, while opposite-side separator 28 is disposed between an opposite Y-direction end of battery stack 21 and opposite-side bind bar 23. With end separator 26 being between the one X-direction end of battery stack 21 and end plate 24 as well as between the opposite X-direction end of battery stack 21 and end plate 25, with side separator 27 being between the one Y-direction end of battery stack 21 and side bind bar 22, and with side separator 28 being between the opposite Y-direction end of battery stack 21 and side bind bar 23, screws are each driven along the X-direction from outside end plate 24, 25 into the through hole of end plate 24, 25 and the tapped hole of side bind bar 22, 23. As a result of driving of the screws, battery stack 21, one-side and opposite-side bind bars 22, 23, one-end and opposite-end plates 24, 25, two end separators 26, and one-side and opposite-side separators 27, 28 are integrated into battery module 20. Prismatic batteries 31 of each of battery stacks 21 have, on their one Y-direction side, respective side faces positioned substantially on an identical plane by being bound by one-side bind bar 22 and have, on their opposite Y-direction side, respective side faces positioned substantially on an identical plane by being bound by opposite-side bind bar 23.

In the exemplary embodiment illustrated by FIG. 1, opposite-side bind bar 23 that is disposed on the opposite Y-direction side of one of two battery stacks 21 adjoining in the Y-direction, and one-side bind bar 22 that is disposed on the one Y-direction side of the other one of battery stacks 21 are the identical side bind bar serving as common side bind bar 38. However, the opposite-side bind bar that is disposed on the opposite Y-direction side of the one of the two battery stacks adjoining in the Y-direction, and the one-side bind bar that is disposed on the one Y-direction side of the other one of the battery stacks may be separate from each other instead of being the integral structure.

In the exemplary embodiment illustrated by FIG. 1, one-end plate 24 is a single common end plate shared by the plurality of battery modules 20 that are aligned in the Y-direction. Thus one-end plate 24 binds respective battery stacks 21 of battery modules 20 at the one X-direction sides of battery stacks 21. Opposite-end plate 25 is a single common end plate shared by the plurality of battery modules 20 and thus binds respective battery stacks 21 of battery modules 20 at the opposite X-direction sides of battery stacks 21. However, the one-end plate to adopt does not have to be the single common end plate that is shared by the plurality of battery modules aligned in the Y-direction. A one-end plate to adopt may be used only at one of the one X-direction sides for battery stack binding in each of the battery modules. Similarly, the opposite-end plate to adopt does not have to be the single common end plate that is shared by the plurality of battery modules aligned in the Y-direction. An opposite-end plate to adopt may be used only at one of the opposite X-direction sides for battery stack binding in each of the battery modules.

As described above, the plurality of prismatic batteries 31 and the plurality of inter-battery separators 32 may be included in alternately stacked relation in battery stack 21 with adjacent prismatic batteries 31 being insulated from each other by inter-battery separator 32. Moreover, battery stack 21 may include end separators 26, one disposed to fill a space between prismatic battery 31 positioned at the one X-direction end of battery stack 21 and one-end plate 24, and the other disposed to fill a space between prismatic battery 31 positioned at the opposite X-direction end of battery stack 21 and opposite-end plate 25. In this structure, end separators 26 may be elastic. In that case, even when a dimensional change is caused to at least one of the space between prismatic battery 31 positioned at the one X-direction end and one-end plate 24 and the space between prismatic battery 31 positioned at the opposite X-direction end and opposite-end plate 25, end separator 26 can readily fill the at least one of the space between prismatic battery 31 positioned at the one X-direction end and one-end plate 24 and the space between prismatic battery 31 positioned at the opposite X-direction end and opposite-end plate 25. Close fitting of battery stack 21 in the X-direction can thus be achieved as a preferable result.

Continued reference is made to FIG. 1. Each prismatic battery 31 includes positive electrode terminal 42 and negative electrode terminal 43. Positive electrode terminal 42 and negative electrode terminal 43 each project upward from upper face 45 of prismatic battery 31 and are spaced in the Y-direction. In FIG. 1, positive electrode terminal 42 and negative electrode terminal 43 are marked respectively with + and − in order to be readily distinguished. In the FIG. 1 example, each battery stack 21 includes six prismatic batteries 31, and its first, second and third prismatic batteries 31 from its one X-direction side are stacked to assume an identical position such that their respective positive electrode terminals 42 are aligned in the X-direction. Fourth, fifth and sixth prismatic batteries 31 from the one X-direction side of each battery stack 21 are stacked to each assume a position reverse to the positions of first, second and third prismatic batteries 31 from the one X-direction side. Therefore, respective positive electrode terminals 42 of first, second and third prismatic batteries 31 from the one X-direction side of each battery stack 21 are aligned, in the X-direction, with respective negative electrode terminals 43 of fourth, fifth and sixth prismatic batteries 31 from the one X-direction side. Similarly, respective negative electrode terminals 43 of first, second and third prismatic batteries 31 from the one X-direction side of each battery stack 21 are aligned, in the X-direction, with respective positive electrode terminals 42 of fourth, fifth and sixth prismatic batteries 31 from the one X-direction side. Two battery stacks 21 adjoining in the Y-direction have pairs of prismatic batteries 31 each adjoining in the Y-direction. Each of these pairs of prismatic batteries 31 assume an identical position, so that positive electrode terminal 42 of one of the pair faces negative electrode terminal 43 of the other one of the pair in the Y-direction.

Battery pack 1 also includes five bus bars (first through fifth bus bars) 41a to 41e. Each of first through fifth bus bars 41a to 41e is plate-shaped and is made of a conductive material such as a metallic material. First bus bar 41a touches and electrically connects three positive electrode terminals 42 positioned on an opposite Y-direction side (a right side in the drawing) of first, second and third prismatic batteries 31 from one X-direction side of first module 20a of two battery modules 20 that is disposed on the right side in the drawing. In plan view, first bus bar 41a has three through holes that correspond in shape to those three positive electrode terminals 42, respectively. Those three positive electrode terminals 42 are inserted into these three through holes, respectively. Thereafter, a nut is screwed onto a part of each of those positive electrode terminals 42 that projects upward from first bus bar 41a, or welding is carried out. Consequently, first bus bar 41a is connectively fixed to those three positive electrode terminals 42.

Second bus bar 41b electrically connects three negative electrode terminals 43 of first, second and third prismatic batteries 31 from the one X-direction side of first module 20a, and three positive electrode terminals 42 of second module 20b that respectively face those three negative electrode terminals 43 in the Y-direction. In plan view, second bus bar 41b has six through holes that correspond respectively to those three negative electrode terminals 43 and three positive electrode terminals 42. Through use of the six through holes, second bus bar 41b is connectively fixed to those three negative electrode terminals 43 and three positive electrode terminals 42 in the same manner as first bus bar 41a is fixed.

Third bus bar 41c electrically connects three negative electrode terminals 43 and three positive electrode terminals 42 of second module 20b that are substantially aligned in the X-direction on one Y-direction side of second module 20b. Third bus bar 41c is of elongated shape and has a slightly shorter X-direction length than battery stack 21. In plan view, third bus bar 41c has six through holes that correspond respectively to those three negative electrode terminals 43 and three positive electrode terminals 42. Through use of the six through holes, third bus bar 41c is connectively fixed to those three negative electrode terminals 43 and three positive electrode terminals 42 in the same manner as first bus bar 41a is fixed.

Fourth bus bar 41d electrically connects three negative electrode terminals 43 positioned on an opposite Y-direction side of fourth, fifth and sixth prismatic batteries 31 from one X-direction side of second module 20b, and three positive electrode terminals 42 of first module 20a that respectively face those three negative electrode terminals 43 in the Y-direction. In plan view, fourth bus bar 41d has six through holes that correspond respectively to those three negative electrode terminals 43 and three positive electrode terminals 42. Through use of the six through holes, fourth bus bar 41d is connectively fixed to those three negative electrode terminals 43 and three positive electrode terminals 42 in the same manner as first bus bar 41a is fixed.

Fifth bus bar 41e electrically connects three negative electrode terminals 43 positioned on an opposite Y-direction side of fourth, fifth and sixth prismatic batteries 31 from the one X-direction side of first module 20a. In plan view, fifth bus bar 41e has three through holes that correspond to those three negative electrode terminals 43, respectively. Through use of the three through holes, fifth bus bar 41e is connectively fixed to those three negative electrode terminals 43 in the same manner as first bus bar 41a is fixed.

First, second and third prismatic batteries 31 from the one X-direction side of first module 20a, first bus bar 41a, and second bus bar 41b form first parallel battery structure 50a that has parallel connection of three prismatic batteries 31. First, second and third prismatic batteries 31 from the one X-direction side of second module 20b, second bus bar 41b, and third bus bar 41c form second parallel battery structure 50b that has parallel connection of three prismatic batteries 31. Fourth, fifth and sixth prismatic batteries 31 from the one X-direction side of second module 20b, third bus bar 41c, and fourth bus bar 41d form third parallel battery structure 50c that has parallel connection of three prismatic batteries 31. Fourth, fifth and sixth prismatic batteries 31 from the one X-direction side of first module 20a, fourth bus bar 41d, and fifth bus bar 41e form fourth parallel battery structure 50d that has parallel connection of three prismatic batteries 31. Third bus bar 41c connects second parallel battery structure 50b and third parallel battery structure 50c in series. Included among the plurality of bus bars 41a to 41e that are included in battery connection structure 60 are bus bars 41b, 41d, each of which electrically connects the respective plurality of electrode terminals of the plurality of prismatic batteries 31 that line up in the X-direction in the same battery stack 21 and the respective plurality of electrode terminals of the plurality of prismatic batteries included in adjacent battery stack 21 positioned in the Y-direction. Electrically connected by these bus bars 41b, 41d, electrodes of one of battery stacks 21 differ in polarity from electrodes of the other one of battery stacks 21.

A brief summary of the above contents is as follows. Battery pack 1 includes, in battery storage room 18, the pluralities of prismatic batteries 31 (twelve prismatic batteries 31 in the FIG. 1 example) as the rows. Each of the rows includes two or more prismatic batteries 31 (six prismatic batteries 31 in the FIG. 1 example) that are disposed in substantially parallel relation with Y-direction (widthwise extending) side faces of these prismatic batteries 31 being aligned in the X-direction (along the depth of each prismatic battery 31). Battery pack 1 also includes the plurality of bus bars 41a to 41e serving to form the plurality of parallel battery structures 50a to 50d (five parallel battery structures 50a to 50d in the FIG. 1 example). Each of parallel battery structures 50 has parallel connection of two or more prismatic batteries 31. The plurality of bus bars 41a to 41e electrically connect the pluralities of prismatic batteries 31 to connect the plurality of parallel battery structures 50a to 50d in series. As illustrated in FIG. 1, the plurality of parallel battery structures 50 connected in series form battery connection structure 60 that includes turn 70 causing a reversal of direction of series connection of parallel battery structures 50. Specifically, in the FIG. 1 example, first parallel battery structure 50a and second parallel battery structure 50b are connected in series in one direction along the Y-direction (in a right-to-left direction in FIG. 1), while third parallel battery structure 50c and fourth parallel battery structure 50d are connected in series in an opposite direction along the Y-direction (in a left-to-right direction in FIG. 1). This means that these two directions are opposite from each other.

In the FIG. 1 example, battery connection structure 60 formed by series connection of four parallel battery structures 50 has the form of turn 70 as a whole.

A detailed description is provided next of structure of lid 12 of housing 10. As FIG. 2 illustrates, underside 80 of lid 12 includes upper underside part 81, lower underside part 82 that is in a lower position along the Z-direction than upper underside part 81, and step 83 connecting an edge of lower underside part 82 and upper underside part 81. At least one part of lower underside part 82 touches an upper surface of at least one of bus bar 41a, bus bar 41b, bus bar 41c, bus bar 41d, or bus bar 41e. In the FIG. 2 example, the at least one part of lower underside part 82 touches fourth bus bar 41d. Battery pack 1 also includes one or more fastening members 85 that fasten the at least one of bus bar 41a, bus bar 41b, bus bar 41c, bus bar 41d, or bus bar 41e to the at least one part of lower underside part 82. Fastening member 85 includes, for example, bolt 86 and nut 87. A head of bolt 86 touches a lower surface of bus bar 41a, 41b, 41c, 41d, 41e. A shaft of bolt 86 passes through bus bar 41a, 41b, 41c, 41d, 41e and lid 12 and projects upward from lid 12. When nut 87 is screwed onto the shaft from above lid 12, the at least one part of lower underside part 82 and the at least one of bus bar 41a, bus bar 41b, bus bar 41c, bus bar 41d, or bus bar 41e are fixed together while touching each other. If lid 12 is a conductive member such as the metal member, for insulation between lid 12 and bus bar 41a, 41b, 41c, 41d, 41e, bus bar 41a, 41b, 41c, 41d, 41e is covered with an insulating resin film at its surface of contact with lid 12, or lid 12 is formed with an insulating film or the like at its surface of contact with bus bar 41a, 41b, 41c, 41d, 41e. Bolt 86 and nut 87 are also insulated from bus bar 41a, 41b, 41c, 41d, 41e.

As illustrated in FIG. 2, each pair of prismatic batteries 31 adjoining in the Y-direction are fixed by second or fourth bus bar 41b, 41d with one-side separator 27, common side bind bar 38, and opposite-side separator 28 being held between the pair of prismatic batteries 31. Because of being held in between, one-side separator 27 is pressed against and touches one side face of common side bind bar 38. Because of being held in between, opposite-side separator 28 is pressed against and touches an opposite side face of common side bind bar 38.

Figure 3:
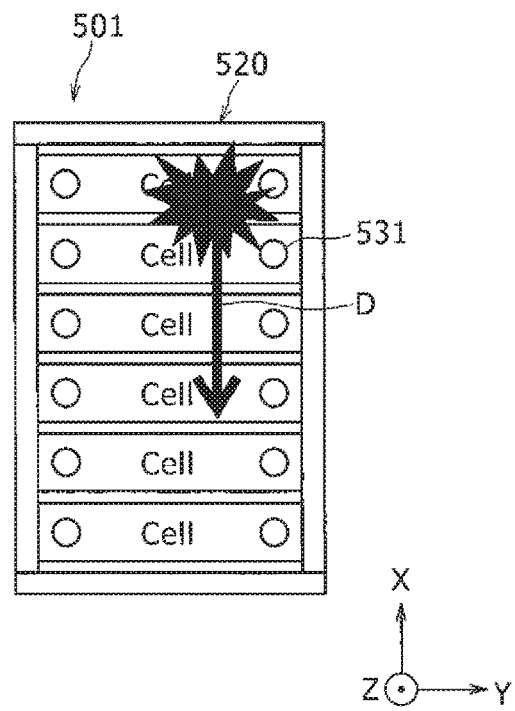
FIG. 3 is a plan view of a battery module of a battery pack used as a reference example.

FIG. 3 is a plan view of battery module 520 of battery pack 501 used as a reference example. A description is hereinafter provided of superiority of battery pack 1 in comparison to battery pack 501, which is used as the reference example. In battery pack 501 used as the reference example, bus bars only provide electrical connections of electrodes only among prismatic batteries 531 of battery module 520 illustrated in plan view by FIG. 3. When prismatic battery 531 is abnormally heated in battery module 520, the bus bars can only disperse heat of this prismatic battery 31 along the X-direction as indicated by arrow D in FIG. 3.

According to the above exemplary embodiment, on the other hand, battery connection structure 60 formed by the series connection of the plurality of parallel battery structures 50 includes turn 70 causing the reversal of direction of series connection of parallel battery structures 50. Battery connection structure 60 therefore includes single bus bar 41c and single bus bar 41d that electrically connect the electrode terminals adjoining in the Y-direction and the electrode terminals adjoining in the X-direction. When prismatic battery 31 is abnormally heated in battery connection structure 60, at least one of bus bar 41a, bus bar 41b, bus bar 41c, bus bar 41d, or bus bar 41e can thus disperse heat of this prismatic battery 31 not only along the X-direction but also along the Y-direction over a two-dimensional plane as indicated by arrows B and C. Consequently, the heat of abnormally heated prismatic battery 31 can easily be dispersed over a wider area for suppression of heat damage to those prismatic batteries 31 working normally.

Formed by the series connection of the plurality of parallel battery structures 50, battery connection structure 60 includes turn 70 causing the reversal of direction of series connection of parallel battery structures 50. Therefore, battery connection structure 60 that is capable of supplying high output power can be disposed in a smaller space. Thus battery pack 1 capable of supplying the high output power can be made compact.

The at least one part of lower underside part 82 touches the upper surface of the at least one of bus bar 41a, bus bar 41b, bus bar 41c, bus bar 41d, or bus bar 41e. Therefore, heat of abnormally heated prismatic battery 31 can be conducted to housing 10 that has a larger heat capacity via the upper surface of the at least one of bus bar 41a, bus bar 41b, bus bar 41c, bus bar 41d, or bus bar 41e and the at least one part of lower underside part 82. In this way, housing 10 can be used as a heat sink. An increased heat dispersion effect can thus be achieved in each stage with respect to abnormally heated prismatic battery 31, so that further suppression of heat damage to those prismatic batteries 31 working normally can be achieved. It is to be noted that housing 10 may touch bus bar 41a, 41b, 41c, 41d, 41e at any part of lid 12.

Battery pack 1 also includes fastening member 85 that fastens the at least one of bus bar 41a, bus bar 41b, bus bar 41c, bus bar 41d, or bus bar 41e to the at least one part of lower underside part 82. Therefore, a clearance is prevented from being left between the at least one of bus bar 41a, bus bar 41b, bus bar 41c, bus bar 41d, or bus bar 41e and the at least one part of lower underside part 82, and heat transmitted to the at least one of bus bar 41a, bus bar 41b, bus bar 41c, bus bar 41d, or bus bar 41e can be conducted to housing 10 without fail. In addition, with use of fastening member 85, battery modules 20 can be fixed to housing 10. Therefore, battery modules 20 can be precisely positioned with respect to housing 10.

One-side separator 27, common side bind bar 38, and opposite-side separator 28 are snugly held between each pair of prismatic batteries 31 that adjoin in the Y-direction. Therefore, one-side separator 27, common side bind bar 38, and opposite-side separator 28 can conduct heat of abnormally heated prismatic battery 31 between prismatic batteries 31 adjoining in the Y-direction. An even increased heat dispersion effect can thus be achieved with respect to abnormally heated prismatic battery 31, so that further suppression of heat damage to those prismatic batteries 31 working normally can be achieved.

Included among the plurality of bus bars 41a to 41e that are included in battery connection structure 60 is elongated bus bar 41c that is included in turn 70 and electrically connects electrode terminals 42, 43 that are aligned in the Y-direction. Elongated bus bar 41c includes inter-electrode part 89 (refer to FIG. 1) that is positioned between negative electrode terminal 43 and positive electrode terminal 42 that are aligned in the X-direction. The lower underside part's at least one part mentioned above may include a part touching this inter-electrode part 89.

Positive electrode terminals 42 are disposed on one X-direction side of elongated bus bar 41c, while negative electrode terminals 43 are disposed on an opposite X-direction side of bus bar 41c. Therefore, current flows from the one X-direction side to the opposite X-direction side and is less likely to branch. In particular, positioned between negative electrode terminal 43 and positive electrode terminal 42 that are aligned in the X-direction, inter-electrode part 89 of elongated bus bar 41c is a part connecting second parallel battery structure 50b and third parallel battery structure 50c in series, thus allowing passage of a large current compared with a part connecting prismatic batteries 31 in parallel or the bus bar connecting prismatic batteries 31 in parallel. With inter-electrode part 89 touching lid 12 as in this modification, easy conduction of an increased amount of heat to housing 10 is achieved as a preferable result. It is also preferable that at least inter-electrode part 89 of elongated bus bar 41c have, for example, an increased width or thickness to have a larger cross-sectional area than bus bar 41a, 41e that serves to form the single parallel battery structure so that inter-electrode part 89 has a suppressed amount of heat generation.

As illustrated in FIG. 2, common side bind bar 38 may internally include room 94 that extends in the X-direction. A harness for battery pack 1 may be disposed in this room 94. However, providing a passage for a coolant in room 94 can have such a preferable effect that the coolant effectively cools prismatic batteries 31.

It is to be noted that the present disclosure is not limited to the above-described exemplary embodiment and modifications thereof. Various improvements and alternations can be made as falling within the scope of the present application's claims together with all equivalents thereof.

In the above exemplary embodiment, for example, lid 12 includes upper underside part 81 and lower underside part 82, and the at least one part of lower underside part 82 touches the upper surface of the at least one of bus bar 41a, bus bar 41b, bus bar 41c, bus bar 41d, or bus bar 41e. Battery pack 1 includes fastening member 85 that fastens the at least one of bus bar 41a, bus bar 41b, bus bar 41c, bus bar 41d, or bus bar 41e to the at least one part of lower underside part 82. One-side separator 27, common side bind bar 38, and opposite-side separator 28 are snugly held between each pair of prismatic batteries 31 adjoining in the Y-direction.

Figure 4:
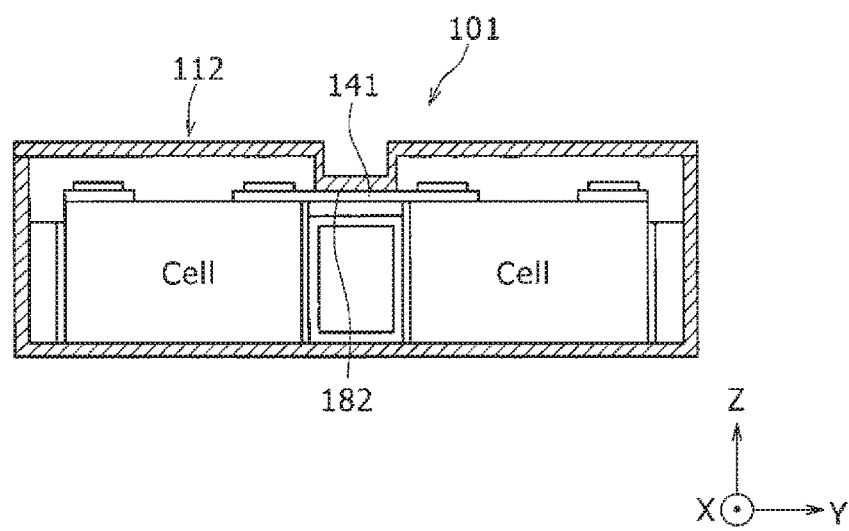
FIG. 4 is a schematic sectional view of a battery pack variation, the section corresponding to FIG. 2.

However, as schematically illustrated in section by FIG. 4, which corresponds to FIG. 2, battery pack 101, which is a variation, does not have to include a fastening member that fastens together bus bar 141 and lower underside part 182 of lid 112 that bus bar 141 touches at its upper surface.

Figure 5:
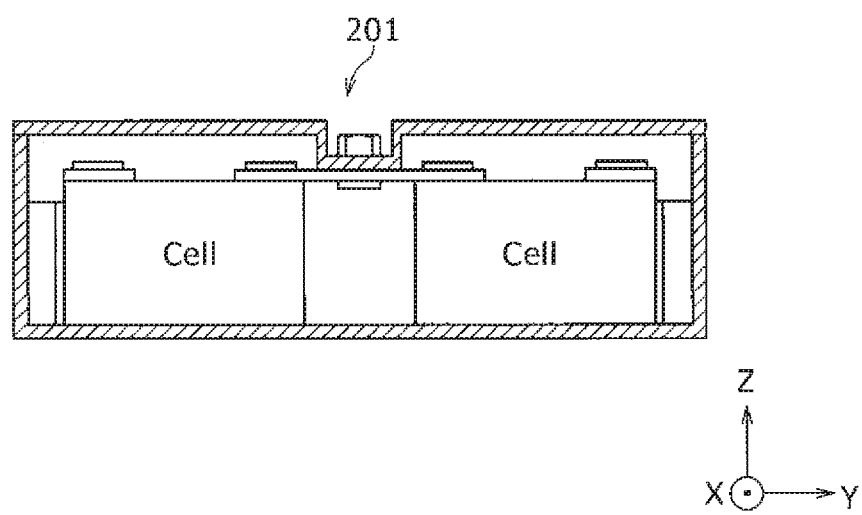
FIG. 5 is a schematic sectional view of another battery pack variation, the section corresponding to FIG. 2.

Moreover, as schematically illustrated in section by FIG. 5, which corresponds to FIG. 2, battery pack 201, which is another variation, does not have to include common side bind bar 38, and one-side and opposite-side separators 27, 28 that might otherwise be disposed on opposite Y-direction sides of common side bind bar 38, compared with battery pack 1. Alternatively, only a common side bind bar made of an insulating material such as a resin may be snugly held between each pair of prismatic batteries adjoining in the Y-direction to directly touch the pair of prismatic batteries adjoining in the Y-direction.

Figure 6:
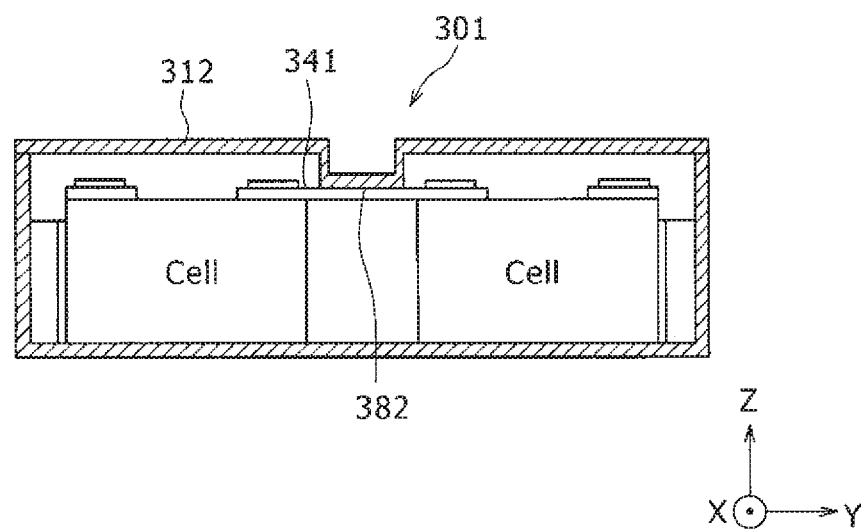
FIG. 6 is a schematic sectional view of yet another battery pack variation, the section corresponding to FIG. 2.

Furthermore, as schematically illustrated in section by FIG. 6, which corresponds to FIG. 2, battery pack 301, which is yet another variation, does not have to include a fastening member that fastens together bus bar 341 and lower underside part 382 of lid 312 that bus bar 341 touches at its upper surface. Battery pack 301 also does not have to include the common side bind bar, and the one-side and opposite-side separators that might otherwise be disposed on the opposite Y-direction sides of the common side bind bar. Although not illustrated, a lid of a housing may have the shape of a flat plate and thus has no recess so as to include no part of contact with a bus bar.

Described battery pack 1 includes, as the two rows, battery stacks 21 each including six prismatic batteries 31. Every one of parallel battery structures 50 described has the parallel connection of three prismatic batteries 31. Described battery stacks 21 all have the same number of prismatic batteries 31. Described battery connection structure 60 formed by the series connection of the plurality of parallel battery structures 50 has the form of turn 70 as a whole.

However, the battery pack may include three or more battery stacks disposed as three or more rows. Each of the battery stacks may include any number of prismatic batteries other than six prismatic batteries. The battery pack may include two or more battery stacks that have different numbers of stacked prismatic batteries. The battery connection structure formed by the series connection of the plurality of parallel battery structures may include the turn as its part.

Figure 7:
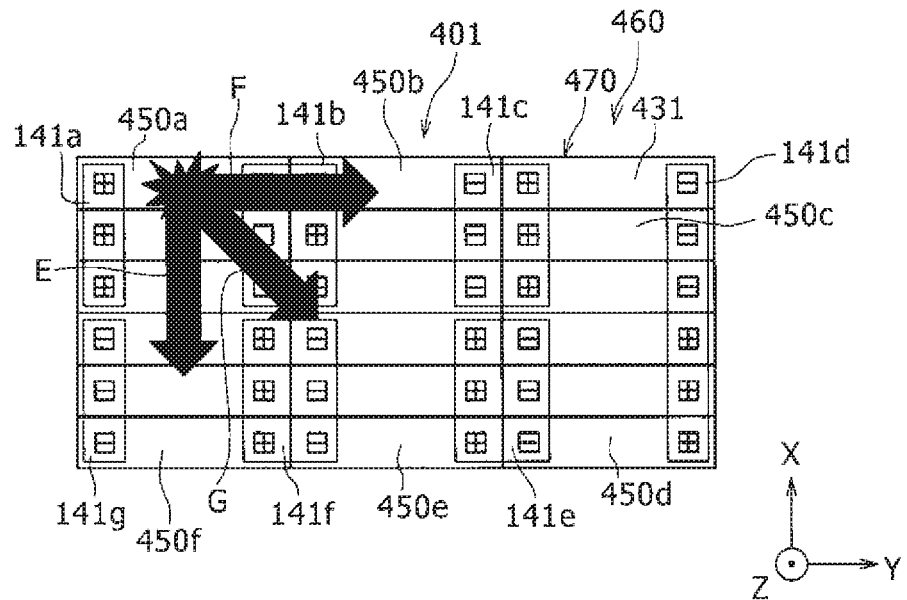
FIG. 7 is a plan view of a battery connection structure of still yet another battery pack variation.

For example, as illustrated in FIG. 7 that is a plan view of battery connection structure 460 of battery pack 401, which is still yet another variation, battery pack 401 may include first parallel battery structure 450a that has parallel connection of three prismatic batteries 431, and second parallel battery structure 450b that has parallel connection of three prismatic batteries 431. Battery pack 401 may also include third parallel battery structure 450c that has parallel connection of three prismatic batteries 431, and fourth parallel battery structure 450d that has parallel connection of three prismatic batteries 431. Battery pack 401 may also include fifth parallel battery structure 450e that has parallel connection of three prismatic batteries 431, and sixth parallel battery structure 450f that has parallel connection of three prismatic batteries 431. In battery connection structure 460, first through sixth parallel battery structures 450a to 450f may be connected in series by bus bars 141a to 141g. Turn 470 may be formed by second through fifth parallel battery structures 450b to 450e that are connected in series by bus bars 141b to 141f, thus being a part of battery connection structure 460.

Figure 8:
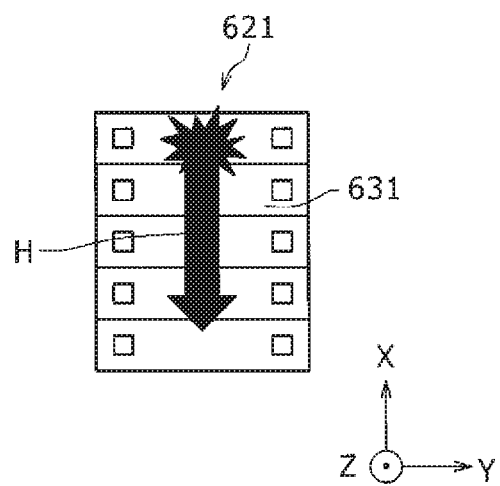
FIG. 8 is a schematic plan view of a battery stack that conducts heat only in one direction via bus bars.

It is to be noted that various separators, side bind bars, and end plates that are included in the FIG. 7 example are not illustrated. Compared with an example illustrated in FIG. 8 that shows bus bars providing electrical connections of two or more prismatic batteries 631 only within battery stack 621 and conducting heat only along the X-direction (in one direction) as indicated by arrow H, even this variation can disperse heat of abnormally heated prismatic battery 431 over a two-dimensional plane which includes arrows E, F, and G, so that preferable suppression of heat damage to those prismatic batteries 431 working normally can be achieved.

Described battery stacks 21 (each including the plurality of prismatic batteries 31 stacked in a direction along the depth of each prismatic battery 31) that are included in battery pack 1 are all disposed in substantially parallel relation. However, the battery pack may include two or more battery stacks that extend orthogonally to each other.

The structure such that any of the bus bars illustrated in FIGS. 2 and 4 to 6 electrically connects those two or more prismatic batteries, directly touches those respective electrodes of the two or more prismatic batteries and touches the part of the lid may be applied to a battery pack which does not include a battery connection structure including the above-described turn. Even in this case, with the bus bar touching the part of the lid, heat of the abnormally heated prismatic battery can be effectively dissipated to a housing for suppression of heat damage to the prismatic batteries other than the abnormally heated prismatic battery. It goes without saying that the described modifications each using battery pack 1, 101, 201, 301, 401 that includes turn 70, 470 can be applied to battery packs that each include no turn with a lid touching a bus bar.

The invention claimed is:

1. A battery pack comprising:
a housing including a main body and internally defining a battery storage room;
a plurality of prismatic batteries disposed in rows in the battery storage room with each of the rows including two or more of the plurality of prismatic batteries, the two or more of the plurality of prismatic batteries being disposed in substantially parallel relation with widthwise extending side faces of the two or more of the plurality of prismatic batteries being aligned in a direction along a depth of each of the two or more of the plurality of prismatic batteries; and
a plurality of bus bars forming a plurality of parallel battery structures that each have parallel connection of two or more of the plurality of prismatic batteries, the plurality of bus bars electrically connecting the plurality of prismatic batteries to connect the plurality of parallel battery structures in series, wherein:
the plurality of parallel battery structures connected in series form a battery connection structure that includes a turn causing a reversal of direction of series connection of the plurality of parallel battery structures,
the plurality of parallel battery structures in series are connected such that each parallel battery structure is connected to an adjacent parallel battery structure in a widthwise direction,
the housing includes a lid abutting an upper end face of the main body,
an underside of the lid includes:
an upper underside part,
a lower underside part that is in a lower position along a height than the upper underside part, and
a step connecting an edge of the lower underside part and the upper underside part,
the lower underside part is located entirely between the rows including the plurality of prismatic batteries,
in a height direction of the plurality of prismatic batteries, at least a portion of the lower underside part is located above an upper face of each prismatic battery of the plurality of prismatic batteries, and
in the height direction of the plurality of prismatic batteries, the upper end face of the main body is located above an upper face of each prismatic battery of the plurality of prismatic batteries.

2. The battery pack according to claim 1, wherein:
the main body includes a recess, the recess including only an upper opening in a direction along a height of the main body,
the lid closes the upper opening, and
at least one part of the lower underside part positioned over the plurality of bus bars touches the plurality of bus bars.

3. The battery pack according to claim 2, wherein:
the plurality of bus bars include an elongated bus bar that is included in the turn and electrically connects a plurality of electrode terminals aligned in the direction along the depth,
the elongated bus bar includes an inter-electrode part positioned between a negative electrode terminal and a positive electrode terminal of the plurality of electrode terminals aligned in the direction along the depth, and
at least one part of the lower underside part includes a part touching the inter-electrode part.

4. The battery pack according to claim 2, further comprising a fastening member fastening at least one part of the lower underside part and the plurality of bus bars together.

5. The battery pack according to claim 1, wherein one of:
a bind bar extending in the direction along the depth; or
a combination of the bind bar, an insulating one-side separator touching one side face of the bind bar, and an insulating opposite-side separator touching an opposite side face of the bind bar,
is held between a widthwise adjoining pair of the plurality of prismatic batteries.

6. The battery pack according to claim 1, wherein:
the underside of the lid includes an underside surface that includes the upper underside part and the lower underside part,
the upper underside part does not contact the plurality of bus bars, and
only the lower underside part contacts at least one bus bar of the plurality of bus bars.

7. The battery pack according to claim 1, wherein, in the height direction of the plurality of prismatic batteries, an entirety of the lower underside part is located above the upper face of each prismatic battery of the plurality of prismatic batteries.

8. The battery pack according to claim 1, wherein, in the height direction of the plurality of prismatic batteries, the upper end face of the main body is located above the lower underside part.

* * * * *